United States Patent Office 3,374,606
Patented Mar. 26, 1968

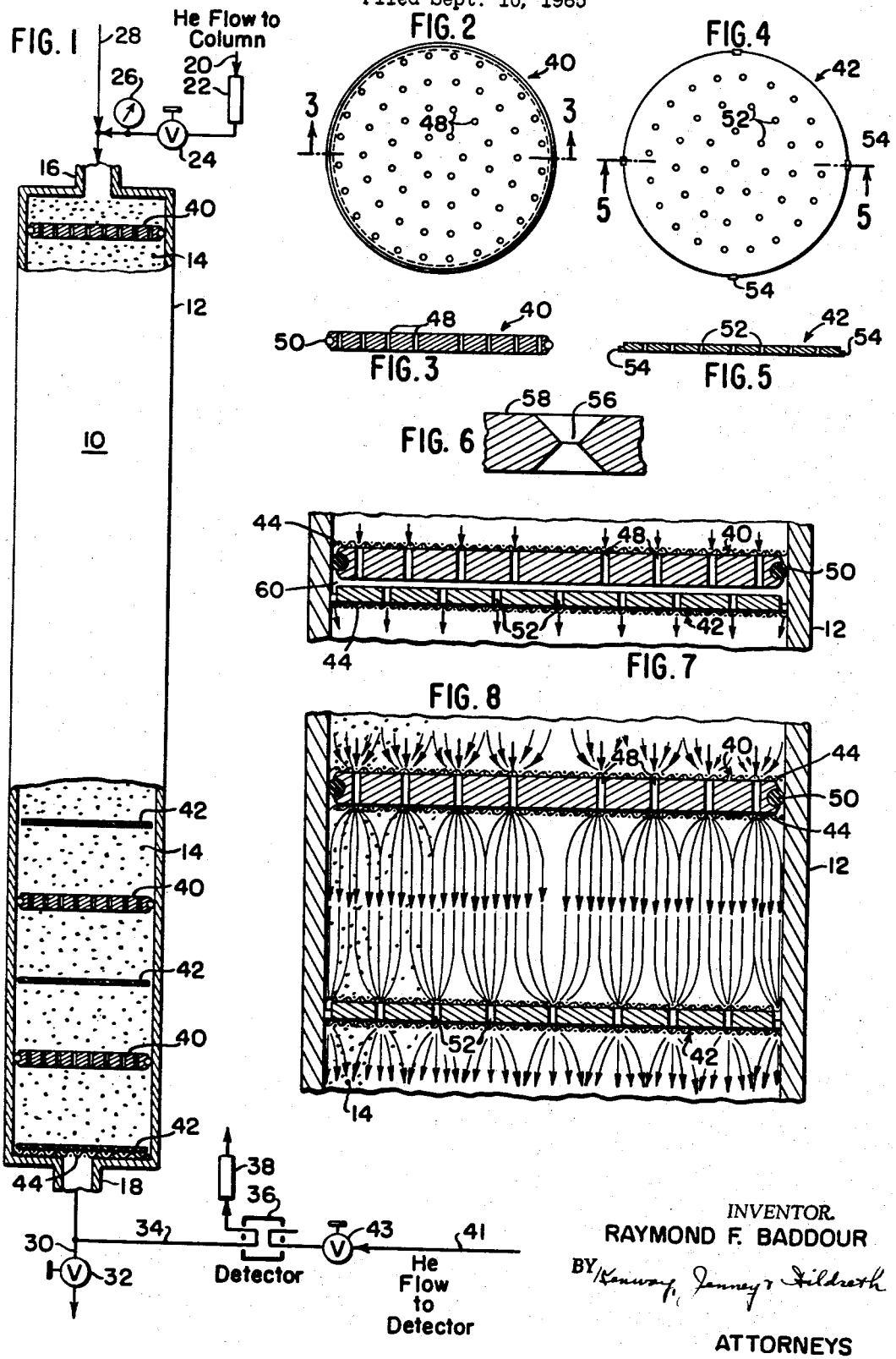

3,374,606
METHOD OF AND APPARATUS FOR CHROMATOGRAPHIC SEPARATIONS
Raymond F. Baddour, Belmont, Mass., assignor, by mesne assignments, to Abcor, Inc., Cambridge, Mass., a corporation of Massachusetts
Continuation-in-part of applications Ser. No. 246,782, Dec. 24, 1962, and Ser. No. 435,649, Feb. 26, 1965. This application Sept. 10, 1965, Ser. No. 491,482
41 Claims. (Cl. 55—67)

ABSTRACT OF THE DISCLOSURE

A chromatographic column having enhanced resolving power for the separation of gas mixtures is provided by incorporating partition elements having a plurality of flow passages therein such as sieve plates in the column. The partition elements may have separatory packing material on each side or be placed in a close back-to-back position to define a flat disc-like mixing space between the elements. The partition elements promote radial mixing and lateral flow of the sample and carrier streams in the column.

---

This application is a continuation-in-part of my application S.N. 246,782, filed Dec. 24, 1962 and now abandoned, and my application S.N. 435,649, filed Feb. 26, 1965 and now abandoned and S.N. 447,313, filed Apr. 12, 1965.

My invention relates to an improved method of and apparatus for the chromatographic separations of fluid streams. In particular, my invention concerns a method of and an apparatus for promoting the separation of materials in a relatively large diameter gas chromographic column.

One of the difficulties which has heretofore tended to suppress the commercial development and employment of chromatographic columns for the separation of materials has been the tendency of the columns to lose their resolving power and separatory ability as the diameter of the column is increased. The scaling up of relatively small diameter laboratory-type chromatographic columns to relatively large diameter chromatographic columns of over 2 or 4 inches or more has failed to give comparative separations. In fact, with large diameter columns there is a rapid diminution in the separtion ability as the column increases in diameter. It is believed that channeling of the fluid stream in the packed bed of the chromatographic column contributes to the poor resolving power and diminished separatory ability of large diameter columns. The residence time and flow resistance within the column is considerably different in one radial section of the bed from that in another radial section. One of the most important factors which contributes to the poor performance of the relatively large scale columns is the low radial diffusivity of the fluid in packed beds.

My parent application S.N. 246,782 concerns the use of transverse partition elements arranged in alternating sequence within a chromatographic column, which elements have some non-aligned flow passages. Alternating doughnut and disc baffles were employed to increase the radial mixing of the fluid material as it passed through the packed chromatographic column. These baffles were shown to induce lateral flow of a gas stream flowing through a large diameter chromatographic column and to enhance considerably the separatory ability of a relatively large diameter chromatographic column in comparison with an unbaffled column.

It is an object of my present invention to provide an apparatus for and a method of improving the separatory ability of chromatographic columns, particularly of relatively large diameter columns, by the employment of sieve plates as the particular partition elements within the column.

Further objects and advantages of my invention will be apparent to those persons skilled in the art from the following description, take in conjunction with the accompanying drawing wherein:

FIG. 1 is a schematic and partially cross-sectional representation of a chromatographic apparatus including my improved chromatographic column containing alternating sieve plates having non-aligned flow passages;

FIG. 2 and 4 show a plan elevation view of a pair of sieve plates used in my chromatographic column;

FIGS. 3 and 5 are cross-sectional views along the lines 3—3 and 5—5 respectively of the sieve plates of FIGS. 2 and 4;

FIG. 6 is a fragmentary cross-sectional enlarged schematic view of one type of flow passage useful in my sieve plates;

FIG. 7 is a cross-sectional view of a particular unitary sieve plate of another embodiment of my invention; and FIG. 8 is a fragmentary enlarged schematic illustration of the fluid flow path through a pair of alternating sieve plates in a chromatographic column of my invention.

I have discovered that the separatory ability of chromatographic columns is enhanced by incorporating within the packed bed of the column a certain arrangement of transverse partition elements or baffles, each element composed of a plurality of flow passages. As the spatial distance between individual sieve elements is decreased in the column, it is preferable that the flow passages of each element be in a non-aligned relationship with the flow passages of the next sieve element. Such sieve elements promote radial mixing and lateral transfer within the packed bed of the column. My sieve plates may be arranged in any sequence or position within the packed bed of separatory material in a chromatographic column, thereby separating the column into a series of separatory zones but which are typically spaced equidistant in the column. In one embodiment my sieve plates are placed in the column with separatory material between each sieve plate element. In another embodiment two, three, four or a greater plurality of sieve plate elements are placed in a close, back-to-back relationship without separatory material between the plate elements but with a narrow mixing chamber between the plates. In this embodiment the flow passages of each sieve plate should be substantially non-aligned with the flow passages of each companion adjoining sieve plate. The number and particular spacing of the sieve plates or combinations thereof in the column may be varied, depending upon the need therefor, and the degree of radial mixing or lateral flow desired to improve resolution. In general, as single sieve plate elements, separated by separatory material, are spaced axially closer together, then to obtain the full effectiveness of each plate element, the flow passages of each element should be increasingly non-aligned with respect to each other. When the sieve plate elements are separated by separatory, intervening material, the need for non-aligned, flow passages diminishes considerably.

The flow passages in each sieve plate cause radial mixing by forcing the flow pattern in the column through the limited flow passage area. This forces the fluid to mix and the flow passages then permit redistribution of the mixed flow back into the separatory material of the packed column. When the sieve plates are in a back-to-back relationship the plates force mixing by flow through the flow passages and permits additional mixing in the mixing chamber and mixing in the next non-aligned flow passage before distribution back into the packed column. When the individual sieve plate elements are separated by particulate separatory material the flow emerging from one flow passage of a sieve plate is unable to distinguish its arrival at the flow passage of the next sieve plate, so that a single mixing at the first plate is the functional item. My sieve plate elements may, in one consideration, be viewed as a plurality of disc and doughnut elements in one plane. For example, the flow passage of one sieve plate may represent the flow passage of the doughnut element, and the imperforate section of the next sieve plate representing the disc or distributing element.

A typical sieve plate of my invention possesses a plurality of flow passages, each one of which normally and preferably possesses a substantinally equal area of influence to the passage of fluid therethrough. Normally the total number of flow passages per sieve plate should not be so excessive as to create difficulty in the manufacturing of the plates by the requirement of a great plurality of very fine capillaries or small holes. There is an optimum balance both as regards to manufacturing, operating conditions and results concerning the total number of holes desired in any one or combination of sieve plates.

The flow passages of my sieve plates may vary in size, shape or diameter. For example, a permissible pressure drop can be selected for the system and the hole size for the sieve plates to be used calculated for that pressure drop. My sieve plates permit a significant reduction in the height equivalent theoretical plate (HETP) in comparison with the employment of disc and doughnut baffles in a similar column under the same operating conditions. My sieve plates may be fabricated of metal such as steel or aluminum or of plastics such as Teflon, nylon or other material. The flow passages may be formed therein by drilling, punching, molding or any other suitable means. A preferred easily fabricated sieve plate constitutes a flat solid partition element, having a plurality of straight circular flow passages drilled or formed therein and distributed substantially equidistant over the surface of the partition element.

The flow passages should be arranged to provide an equal surface area influence for each hole. For example, in a typical four inch internal diameter column the number of holes per plate should generally not exceed about 70 holes, and the total area of the holes in the plate should be about equal to the area of one ½" diameter hole. Of course, as the diameter of the column increases the total number of holes will usually increase so as to maintain the same number of holes per unit area for the same pressure drop. The number of plates in each column and the axial spacing between plates may vary depending on the degree of difficulty of the material to be separated, the permissible pressure drop, the operating conditions to be employed and the degree of radial mixing required.

FIG. 1 shows a chromatographic apparatus 10 comprising an elongated cylindrical column 12 having an inlet 16, an outlet 18 and containing therein a bed of finely divided particles 14 capable of effecting the chromatographic separation of a fluid stream such as a gas stream into two or more components. A carrier fluid, such as an inert gas-like helium or nitrogen, argon, hydrogen, methane, steam or the like is permitted to flow from a source (not shown) through an inlet conduit 20 containing a flow metering device 22, such as a Roto-Meter, a fluid flow control valve 24, and a pressure measuring device such as a pressure gage 26, to the column inlet 16. A conduit 28 permits the introduction of the material to be separated by the differences in retention time on the support material of the packed bed within the column to the upper inlet 16. Outlet 18 is in fluid communication with an outlet conduit 30 containing a flow control valve 32 and a sampling conduit 34, to which sampling conduit a portion of the effluent material from the chromatographic column 12 is continuously withdrawn and passed through a detecting device, such as a thermal conductivity cell 36, and hence to a flow meter 38 such as a capillary flow meter. The thermal conductivity cell or other suitable detecting means is used to identify the particular component being withdrawn from the column, such as by detecting the thermal conductivity of the sample gas in comparison to the carrier gas. The helium gas serves as a base reference for comparison purposes in the thermal conductivity cell. The carrier gas is passed to the detector 36 from a reference conduit 41 containing a flow control valve 43 and continually passes to the reference side of the detector cell 36. The detector cell 36 is normally in electrical communication with a graph type recorder wherein a plot of electrical signals from the conductivity device which identifies the particular gas of the sample effluent stream is plotted against the retention time of the sample of that gas in the chromatographic column. In this manner, graphical representations of relative thermal conductivity versus retention time in the column are obtained.

The material 14 normally used in gas chromatography is composed of solid subdivided particles or solid particles having a liquid phase thereon. Disposed in the packed bed material 14 (substantially transverse to the axial flow of the fluid stream introduced into the conduit 28), and transverse to the longitudinal elongated axis of the column 12 are a series of alternating sieve plates 40 and sieve plates 42. One sieve plate 42 is supported on a glass fiber or screen filter 44, which permits the flow of the fluid stream of material through the outlet 18, but retains the particles 14 within the column. Another sieve plate 40 is located adjacent the inlet 16 in order to permit the injected sample material to be dispersed rapidly over the internal column diameter by the sieve plate. A screen or wire 44 or other finely meshed retaining means should be used on either side of each sieve plate element as shown in FIGS. 7 and 8 to prevent particles of separatory material from clogging the flow passages of the plates or from entering the mixing space 60.

In one embodiment of my sieve plates shown more particularly in FIGS. 2, 3, 4 and 5, sieve plate 40 contains a plurality of circular holes 48 drilled therein and an outer peripheral resilient sealing gasket 50 inserted in the channel circumference of the plate, to provide a gastight seal of the plate against the wall of the column. Sieve plate 42 contains a plurality of circular holes 52 and may be thinner than sieve plate 40 since no sealing gasket is needed. The holes 52 are on different radius center than holes 48 so that regardless of radial positioning the holes present an optically opaque column. Sieve plate 42 is characterized by a slight protruding edge element 54 shown in enlarged form for purposes of illustration. This edge element provides a small tolerance as a circumferential gap between the wall of the column 12 and the external diameter of the plate 42 to maintain equal influence of the holes on each plate and the same total hole area. In a typical four-inch column, sieve plate 40 may have 60 holes, and sieve plate 42, 40 holes and a circumferential gap of 0.010 inch with holes 48 and 52 having a diameter of about 0.060 inch.

Good results are often achieved by arranging the sieve plate in an alternating sequence in an axially disposed spatial arrangement within the packed bed 14 of the column 12 with one pair of sieve plates within an axial column length represented by the internal diameter on the column. The number and location of the sieve plates, may, however, be varied in accordance with the difficulty of the separation and the operating conditions of the column. The number of sieve plates in each column should be such as to provide for the desired alternating and sequential flow of fluid material through the column. In this manner good resolution and separation in relatively large diameter chromatographic columns is accomplished.

FIG. 8 illustrates in a schematic manner the flow of carrier and sample gases through my improved chromatographic columns containing sieve plates 40 and 42. The gases flow through the flow passages 48 of sieve plate 40 and then divides into a number of at least two or more separate gaseous streams. These streams mix with the divided portions of adjacent streams prior to passing through the flow passages 52 of sieve plate 42.

The circumferential gap provided by sieve plate 42 permits the divided gas stream directed to the internal wall of the column 12 to flow through the gap so that each hole may retain an equal influence on the gas stream.

I have found that by employing sieve plates of the type described in a four-inch chromatographic column, the HETP is reduced in comparison with the use of disc and doughnut baffles under similar operating conditions. For example, using as packing material crushed fire brick having a liquid phase of triethylene glycol with dissolved silver nitrate, and a sample gas of a gaseous hydrocarbon mixture of pentene isomers, a carrier gas of nitrogen with the column operated at 20–30° C. and an inlet pressure of 70–75 p.s.i.g. then, under these conditions and with a similar retention time in the column of the sample, the use of sieve plates 40 and 42 as in FIG. 1 gave HETPs 70% of the HETPs of the disc and doughnut baffles.

The employment of sieve plates 40 and 42 gave a substantial increase in the separatory ability over the use of the disc and doughnut type baffles. My sieve plates may also be employed in separating other olefinic hydrocarbon mixtures, as well as other liquid and gas mixtures commonly separated by chromatographic means.

My sieve plates have been shown and described in a typical embodiment wherein the sieve plates divide the chromatographic column into a series of zones of separatory material. However, it is also within the contemplation of my invention that sieve plates 40 and 42 may be employed in combination in a back-to-back relationship without separatory material between the plates as shown for example in FIG. 7.

In this embodiment the plates 40 and 42 are placed together without separatory material between the plates, but with a very small predetermined clearance between the plates sufficient to permit the sample material to flow laterally to the nearest non-aligned hole in the next plate. A large clearance between plates without separatory material should be avoided. If desired, a plurality of plates 40 and 42 rather than the pair illustrated may be employed in this manner where rapid radial mixing and lateral transfer is desired. The sieve plates may be inserted in the column simply as individual components or be fabricated into a single element with the plates fastened together and disposed a predetermined, axial distance from each other, to form a mixing chamber or space 60 containing no separatory material therein. This mixing space 60 permits the fluid moving axially through the column and flowing through the flow passages of the first plate to become equalized in pressure within the column, and to flow laterally across to the non-aligned flow passages of the next sieve plate prior to being distributed back into the separatory material of the column, or flowing through the flow passages of the following plate element. The mixing space 60 between the partition elements should permit further mixing of the fluid after it passes through the flat disc-like space, but should not be sufficiently long in axial length or large in volume to permit the individual components separated in the prior separatory zone, i.e., the separate axially moving concentration fronts of the components of the sample gas to intermingle in the mixing space. Consequently, a large volume in the mixing space would negate all, or at least some of, the separatory efficiency accomplished in the preceding separatory zone. The optimum mixing space will vary with the column, the operating conditions, and the material to be separated; however, in a four-inch column typical axial distances of $\frac{1}{16}$ to $\frac{1}{8}$ of an inch are often usefully employed.

Radial mixing refers to the mixing of the components of the fluid sample stream in a radial plane toward or approximately perpendicular to the axis of the column or to the axis of the fluid flow in the column. Radial mixing thus induces a radial velocity component to the fluid while it is engaged in axial flow. A difference in flow area in the column creates a pressure drop, but also makes the fluid passing through the flow passages converge and mix on a radial plane. This squeezing action induces turbulent flow as the fluid passes through each flow passage of each sieve element. The hold-up time of the fluid during radial mixing, that is the residence time of the fluid passing through the flow passage and in any mixing space, must be short, since longitudinal mixing of the previously separated components is undesirable. A relatively large hold-up time while inducing radial mixing would permit the axially moving concentration fronts to mix during the radial mixing.

FIG. 6 illustrates a particular flow passage which may be usefully employed in my sieve plates to reduce the pressure drop. The sieve plate 58 is fabricated to have a venturi type flow passage 56 of converging and diverging sections.

My sieve plates as described and illustrated are particularly useful in chromatographic columns but may also be used in any packed bed where radial mixing and distribution of fluid is desired. Typical packed beds would include adsorption and absorption beds, catalytic beds and the like for either liquids or gases. My sieve plates may be employed alone or in combination with other partition elements such as disc and doughnut elements.

What I claim is:

1. An apparatus for the chromatographic separation of fluids which apparatus comprises in combination:
    a chromatographic column containing separatory material and means for improving the resolving power of the column including at least first and second partition element means disposed substantially transverse to the axis of the column, said first and second element means comprising partition elements each characterized by a plurality of flow passages therein the flow passages located substantially across the entire face thereof, and each element having contiguous separatory material on both sides of said element thereby imparting lateral flow and mixing of the fluid streams passing through the column;
    means to introduce a fluid sample stream into the column;
    means to introduce a fluid carrier stream into the column;
    means for withdrawing the sample and carrier streams from the column; and
    means for detecting the separated components of the sample fluid.

2. The apparatus of claim 1 wherein the flow passages include venturi-type flow passages.

3. The apparatus of claim 1 wherein the partition elements include a sieve plate element having a predetermined number of flow passages.

4. The apparatus of claim 3 wherein the flow passages in each pair of sieve plates are on different centers of radii whereby regardless of radial position the passages between such elements are axially non-aligned.

5. The apparatus of claim 1 wherein the partition elements include an alternating pair of elements each having a plurality of flow passages therein, the circumference of one element adapted to be placed in a close gas-sealing relationship with the internal wall of the column, and the other element designed to provide a predetermined circumferential gap between the external circumference of the element and the internal wall of the column.

6. The apparatus of claim 1 wherein the flow passages of a first element are substantially non-aligned with the flow passages of the second element directly downstream of the first element.

7. The apparatus of claim 1 wherein the flow passages are disposed over the surface of the element to an approximate equal area of influence.

8. An apparatus for the chromatographic separation of fluids which apparatus comprises in combination:
   a chromatographic column containing separatory material and means for improving the resolving power of the column including at least first and second partition elements disposed substantially transverse to the axis of the column, all the elements in the column being characterized by each having a plurality of flow passages therein, the column containing separatory material and as the only partition elements said partition elements thereby imparting lateral flow and mixing of the fluid streams passing through the column;
   means to introduce a fluid sample stream into the column;
   means to introduce a fluid carrier stream into the column;
   means for withdrawing the sample and carrier fluids from the column; and
   means for detecting the separated components of the sample fluid.

9. The apparatus of claim 8 wherein the flow passages include venturi-type flow passages.

10. The apparatus of claim 8 wherein the partition elements include a sieve plate element having a predetermined number of flow passages.

11. The apparatus of claim 10 wherein the flow passages in each pair of sieve plates are on different centers of radii whereby regardless of radial position the passages between such elements are axially non-aligned.

12. The apparatus of claim 8 wherein the partition elements include an alternating pair of elements, each having a plurality of flow passages therein, the circumference of the first element adapted to be placed in a close gas-sealing relationship with the internal wall of the column, and second element designed to provide a predetermined circumferential gap between the external circumference of the element and the internal wall of the column.

13. The apparatus of claim 8 wherein the flow passages of each element are substantially non-aligned with the flow passages of the element directly downstream of the element.

14. The apparatus of claim 8 wherein the flow passages are disposed over the surface of the element to an approximate equal area of influence.

15. An apparatus for the chromatographic separation of fluids which apparatus comprises in combination:
   a chromatographic column containing separatory material and means for improving the resolving power of the column including a plurality of partition elements disposed substantially transverse to the axis of the column, the elements each characterized by a plurality of flow passages therethrough, the elements including at least a pair of first and second partition elements without separatory material therebetween, and defining a mixing space between the elements, the second element downstream of the first element and adapted to divert a substantial portion of the fluid stream in the mixing space either toward or away from the inner wall of the column, thereby imparting lateral flow and mixing of the fluid streams passing through the column;
   means to introduce a fluid sample stream into the column;
   means to introduce a fluid carrier stream into the column;
   means for withdrawing the sample and carrier fluids from the column; and
   means for detecting the separated components of the sample fluid.

16. The apparatus of claim 15 wherein the flow passages include venturi-type flow passages.

17. The apparatus of claim 15 wherein the partition elements include a part of sieve plates and the flow passages in the sieve plates are on different centers of radii whereby regardless of radial positioning the passages between such elements are non-aligned.

18. The apparatus of claim 15 wherein the flow passages of the first element are substantially non-aligned with the flow passages of the following second element directly downstream of the first element.

19. The apparatus of claim 15 wherein the flow passages are disposed over the surface of the element to an approximate equal area of influence.

20. The apparatus of claim 15 wherein the column includes at least one pair of first and second sieve plate elements arranged in a close back-to-back relationship without intermediate separatory material between each element, to form a mixing space to permit the lateral flow of gaseous material in the said mixing space, the flow passages of the first sieve plate element being substantially non-aligned with the flow passages of the second sieve plate element.

21. The apparatus of claim 20 which includes a plurality of sieve plate elements in a back-to-back relationship with a plurality of mixing spaces formed between each pair of elements.

22. A method of promoting the chromatographic separation of a fluid sample stream into components in a chromatographic column containing separatory material which comprises:
   introducing a fluid sample stream into the column;
   introducing a fluid carrier stream into the column;
   flowing the fluid streams past a series of partition elements, the elements disposed substantially transverse to the axis of the column, and each element having a plurality of flow passages therethrough, at least one pair of first and second elements placed in a close back-to-back relationship to define a mixing space without intermediate separatory material between each element;
   flowing the fluid streams through the flow passages of the first upstream element of the pair of elements;
   flowing the fluid streams against the upstream face of the second element to cause substantial lateral flow of the fluid stream in the mixing space;
   flowing the fluid stream through the flow passages of the second downstream element of the pair of elements thereby providing lateral flow and radial mixing of the carrier and sample streams as they flow through the column; and
   withdrawing the separated components of the sample stream from the column.

23. The method of claim 22 wherein the partition elements include first and second sieve plates, the flow passages of the sieve plates being substantially non-aligned with each other whereby the fluid streams are diverted laterally by the second element after flowing through the flow passages of the first upstream sieve plate element.

24. The method of claim 22 wherein the fluid sample and carrier streams are gas streams.

25. The method of claim 22 which includes detecting the components of the sample stream withdrawn from the column.

26. The method of claim 22 wherein the fluid streams are flowed through a series of partition elements and mixing space, the elements defining more than one mixing space.

27. The method of claim 22 wherein the mixing space is a flat disc-like space between the first and second elements.

28. A method of chromatographically separating a fluid sample stream into one or more chromatographic components which method comprises:
   introducing into a chromatographic column having separatory material therein a fluid sample stream to be separated;
   introducing a fluid carrier stream into said chromatographic column, said carrier stream to drive said sample stream through said column in a generally axial direction;
   obstructing the axial flow of said stream by interposing at least one pair of non-sorptive successive obstructors, each characterized by a plurality of flow passages therein, each obstructor having substantially the same cross-sectional area against which the fluid streams flow, said faces of the obstructors axially spaced, each obstructor providing a pressure drop across substantially the entire face thereof and forcing a substantial part of the fluid to move in paths either toward or away from a transverse portion of the inner wall of the column thereby improving column resolutions; and
   withdrawing the separated components of said fluid sample stream from the column.

29. The method of claim 28 wherein the obstructors include sieve plates.

30. The method of claim 28 wherein the fluid sample and carrier streams are gas streams.

31. The method of claim 28 which includes detecting the components of the fluid streams withdrawn from the column.

32. The method of claim 28 wherein each obstructor is separated by separatory material.

33. The method of claim 28 wherein each pair of obstructors are axially spaced apart a small distance with no separatory material therebetween, to define a mixing space for the streams between each pair of obstructors.

34. The method of claim 33 wherein the mixing space is a flat disc-like empty space.

35. The method of claim 33 wherein the obstructors are sieve plates having substantially non aligned flow passages.

36. The method of claim 33 which includes a plurality of obstructors to define a series of more than one mixing spaces between obstructors.

37. The apparatus of claim 15 wherein there is no other partition element in the mixing space between the first and second partition elements.

38. In a column for the chromatographic separation of a fluid sample flowing through the column, the combination comprising a plurality of sections filled with packing material, each of said packed sections separated from the one following by a disc-shaped collecting, mixing and distributing section, said section being free of packing material to define a mixing space, and having a diameter approximating the inside diameter of the column with the sections perpendicular to the longitudinal axis of the column, said collection, mixing and distributing sections adapted to receive a fluid from a preceding packing section, to mix and direct fluid transversely across the column and to distribute fluid to a succeeding packed section, said collecting, mixing and distributing section comprising at least one pair of plates, each of said plates characterized by a plurality of perforations therethrough, the perforations of the downstream plate positioned to provide substantial lateral flow of the fluid in the mixing space and to distribute the fluid to a succeeding packed section.

39. The column of claim 38 wherein the plates include perforations located toward the outer periphery of said plates.

40. The column of claim 38 wherein the perforations of the plates are substantially non-axially aligned.

41. The column of claim 38 wherein no other plates are included between the pair of plates.

References Cited
UNITED STATES PATENTS

| | | | |
|---|---|---|---|
| 3,310,932 | 3/1967 | Melpolder | 55—386 |
| 2,845,136 | 7/1958 | Robinson | 55—67 |
| 3,230,167 | 1/1966 | Golay | 55—386 |
| 3,250,058 | 5/1966 | Baddour | 55—197 |

OTHER REFERENCES

Versele, A.: A Note on Preparative Scale Gas Chromatography, in J. Chromatog. 9 (1962), p. 116–117, 55/386.

REUBEN FRIEDMAN, *Primary Examiner.*

C. HART, *Assistant Examiner.*